United States Patent [19]

Edwards

[11] Patent Number: 6,142,720

[45] Date of Patent: Nov. 7, 2000

[54] FASTENING INCORPORATING A TUBULAR RIVET

[75] Inventor: Kenneth Edwards, Leicester, United Kingdom

[73] Assignee: Ariel Industries, PLC, United Kingdom

[21] Appl. No.: 09/310,306

[22] Filed: May 12, 1999

[30] Foreign Application Priority Data

| May 15, 1998 | [GB] | United Kingdom | .................... 9810389 |
| Dec. 10, 1998 | [GB] | United Kingdom | .................... 9827035 |

[51] Int. Cl.⁷ .............................. F16B 19/00; F16B 19/08
[52] U.S. Cl. ............................... 411/501; 411/509; 411/15
[58] Field of Search ............................. 411/500–503, 69, 411/43, 15, 508, 509

[56] References Cited

U.S. PATENT DOCUMENTS

| 4,039,099 | 8/1977 | Boxall | .................................. 411/501 X |
| 4,146,118 | 3/1979 | Zankl | .................................. 411/501 X |
| 4,177,545 | 12/1979 | Lambertz | ............................. 411/501 X |
| 4,363,580 | 12/1982 | Bell | ............................................. 411/15 |
| 4,802,803 | 2/1989 | Muller | ................................. 411/501 X |

FOREIGN PATENT DOCUMENTS

| 956155 | 10/1974 | Canada | ................................... 411/501 |

*Primary Examiner*—Neill Wilson
*Attorney, Agent, or Firm*—Ira S. Dorman

[57] ABSTRACT

A fastening incorporates a tubular rivet (11) passing through an aperture in a workpiece (17, 19). The rivet has a tubular shank (15) which is deformed outwardly to retain the rivet in the aperture, the extent of the deformation being such that the tubular shank is rolled outwardly, for example through an angle greater than 180°, forming a toroid in which material which was originally on an inner surface of the tubular shank prior to deformation is on an outer surface of the toroid and able to contact the workpiece (19) and also that material which was originally on an outer surface of the tubular shank prior to deformation is on an inner surface of the toroid and is distant from the workpiece. The deformation is referred to as a "full-roll".

15 Claims, 2 Drawing Sheets

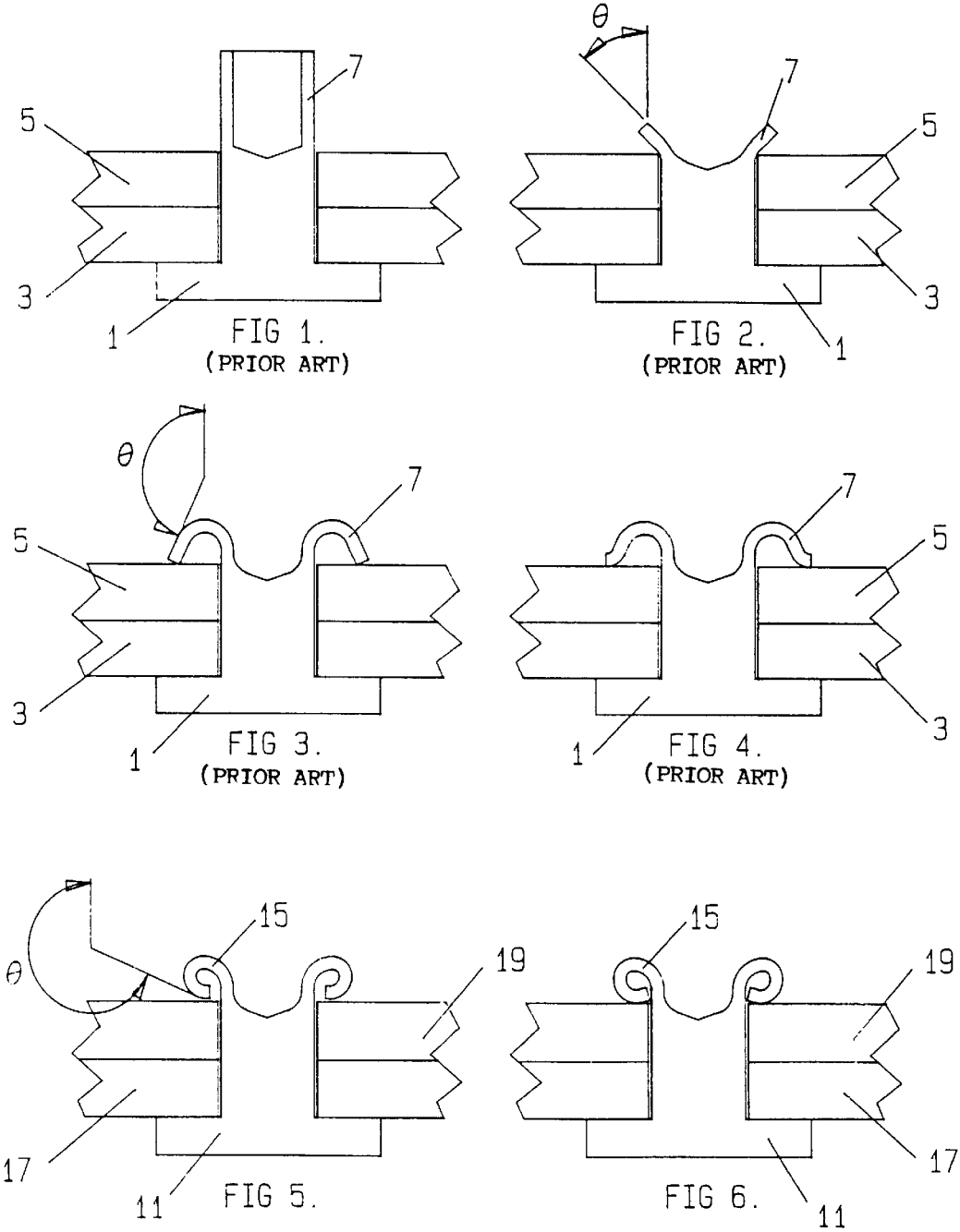

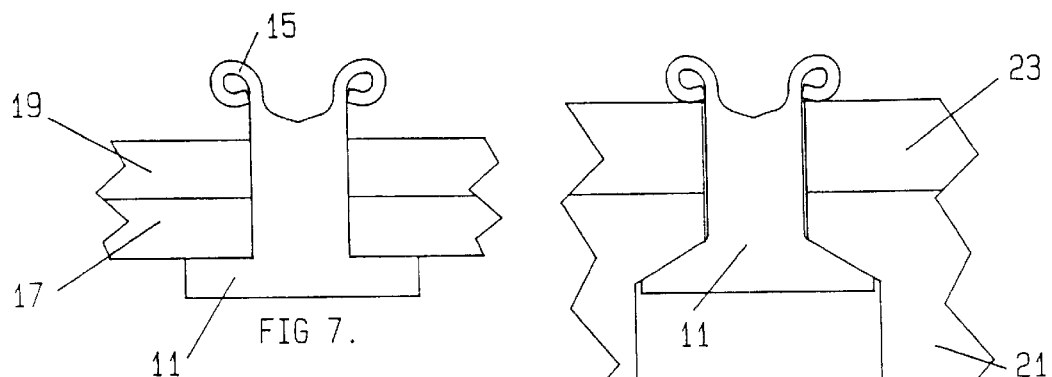
FIG 7.
FIG 8.
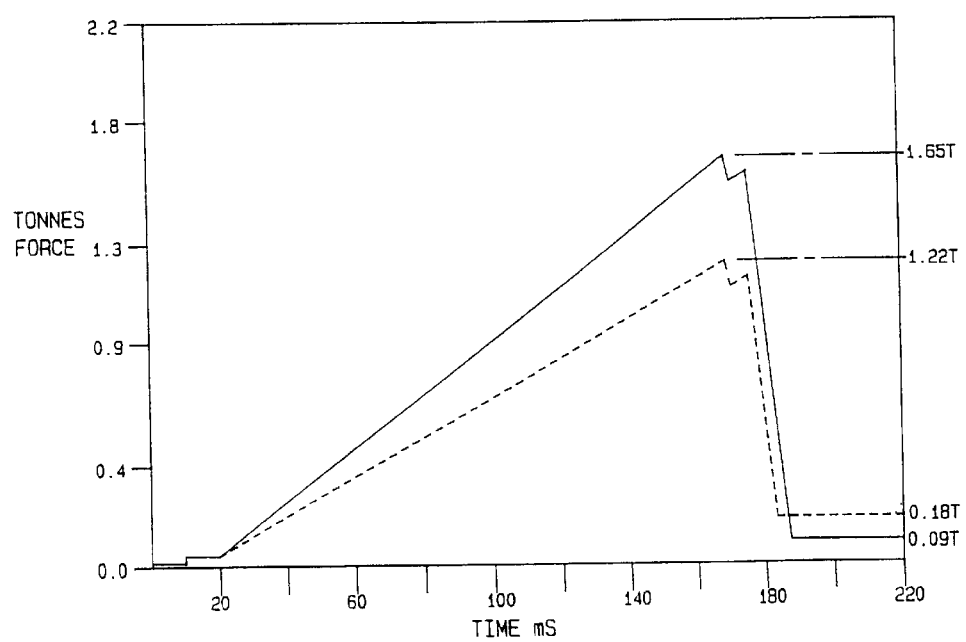
FIG 9.

FASTENING INCORPORATING A TUBULAR RIVET

This invention relates to a fastening incorporating a tubular rivet. It should be noted the term "tubular rivet" as used herein is intended to include semi-tubular rivets.

BACKGROUND TO THE INVENTION

Tubular and semi-tubular rivets are used extensively for fastening work-pieces which have pre-formed holes. Such workpieces can be fastened by inserting into the pre-formed holes a rivet which is longer than the combined thickness of the workpieces and then deforming outwardly (rolling) the protruding tubular end of the rivet to increase its diameter so it cannot return through the pre-formed holes in the workpieces.

The rolling action can be generated by the well-known process of positioning the rivet between a plunger and a setting die in a rivet setting machine and applying sufficient plunger force to cause the tubular end of the rivet to deform outwardly beyond its elastic limit in an approximately circular form. When the plunger force is removed the inherent elasticity of the tube material causes a certain amount of spring-back, but the residual deformation, or permanent set, ensures the rivet cannot return through the pre-formed holes.

Conventional rivet practice is to use the minimum length of tube to achieve the fastening required. Such an arrangement is shown in FIG. 1 in which a semi-tubular rivet 1 is inserted through holes provided in workpieces 3 and 5. If a simple splay set is adequate the tube 7 of the rivet can be very short, as shown in FIG. 2 of the accompanying drawings. For a more secure fastening it is normal to provide a tube length which allows the tube to roll outwardly through an angle θ of almost 180°, as shown in FIG. 3 of the accompanying drawings. Good practice, as illustrated in FIG. 3 of the accompanying drawings, requires that the angle θ of the roll of the tube is always less than 180° so that, if the tube is deformed further after the leading edge has reached the workpiece, the leading edge will slide outwardly along the surface of the workpiece 5, as shown in FIG. 4 of the accompanying drawings. If the angle θ of the roll of the tube is close to 180° the roll will be crushed against the workpiece whenever there is an over-stroking of the rivet setting plunger or when the workpiece is at or above its maximum expected thickness. With a roll angle θ of less than 180° the contact between the rivet and the workpiece is always provided by the material which is on the outer surface of the original tube.

OBJECT OF THE INVENTION

It is therefore an object of the present invention to provide a fastening incorporating a tubular rivet which overcomes or ameliorates the above disadvantages.

SUMMARY OF THE INVENTION

According to the present invention there is provided a fastening incorporating a tubular rivet passing through an aperture in a workpiece, the rivet having a tubular shank which is deformed outwardly to retain the rivet in the aperture, wherein the tubular shank is rolled outwardly forming a toroid in which material which was originally on an inner surface of the tubular shank prior to deformation is on an outer surface of the toroid and able to contact the workpiece, whereas material which was originally on an outer surface of the tubular shank prior to deformation is on an inner surface of the toroid and is distant from the workpiece.

The tubular shank of the rivet may be rolled through an angle greater than 180°.

The tubular shank of the rivet may be rolled through an angle greater than about 225°, for example through an angle of about 270°. In such a case, a free end of the deformed tubular shank forming the toroid may contact the outer surface of the tubular shank in a substantially undeformed region thereof.

The toroid may be spaced from a surface of the workpiece. In this case the rivet may provide an anchor on to which other components can be hooked.

Alternatively, the toroid may be in contact with a surface of the workpiece and may exert a residual clamping force thereagainst. The tubular shank may be a free fit in the aperture.

The present invention also relates to a brake assembly incorporating a fastening as hereinbefore defined.

For a better understanding of the present invention and to show more clearly how it may be carried into effect reference will now be made, by way of example, to the accompanying drawings in which:

BRIEF DESCRIPTION OF THE DRAWINGS

FIG. 1 illustrates a semi-tubular rivet which has been inserted through holes in two workpieces in known manner;

FIG. 2 illustrates a known form of splay fastening applied to the rivet and workpiece assembly shown in FIG. 1;

FIG. 3 illustrates a known form of fastening in which the tube of the rivet in the assembly of FIG. 1 is rolled through an angle of less than 180°;

FIG. 4 illustrates a known form of fastening in which the fastening of FIG. 3 is deformed further such that the leading edge of the rolled rivet tube has moved outwardly along the surface of the workpiece;

FIG. 5 illustrates one embodiment of a fastening according to the present invention;

FIG. 6 illustrates another embodiment of a fastening according to the present invention;

FIG. 7 illustrates a further embodiment of a fastening according to the present invention;

FIG. 8 illustrates an embodiment of a fastening according to the present invention in which a brake lining is fastened to a brake shoe; and FIG. 9 is a graph illustrating forces applied to and by known tubular rivet fastenings as compared with corresponding forces applied to and by fastenings according to the present invention.

DESCRIPTION OF PREFERRED EMBODIMENTS

The known general arrangement of FIG. 1 and the known fastening assemblies of FIGS. 2, 3 and 4 have been described hereinabove.

In the fastening arrangement shown in FIG. 5 a semi-tubular rivet 11 having a head 13 and a tubular shank 15 is inserted through holes provided in workpieces 17 and 19. The length of tubular shank 15 of the rivet protruding beyond the workpiece 19 has permitted the tube to deform outwardly and to roll through an angle θ greater than 180°, that is through an angle of about 270° such that the leading edge of the roll is moving parallel to the face of the workpiece 19 and hence can continue to roll after contacting the workpiece, to form a toroid. Thus, material of the tubular shank 15 which was originally on the inner surface of the tube prior to rolling is now on the outer surface of the toroid and able to contact the workpiece 19, while material which was originally on the outer surface of the tube prior to rolling is now on the inner surface of the toroid and is distant from the workpiece 19. This arrangement is referred to herein as a "full-roll" set of the rivet. In the fastening arrangement shown in FIG. 5 the material now on the outside of the tube is actually in contact with the workpiece 19 and able to exert a residual clamping force thereagainst.

In the fastening arrangement shown in FIG. 6, the rivet 11 has been rolled through an angle greater 270° with the roll in contact with the shank. In practice it has been found that if the roll has proceeded beyond an angle of approximately 225° before contacting the workpiece 19 the tube will continue to roll without crushing.

A full-roll set as described herein can provide three main benefits over conventional sets:

A. A full-roll can provide a higher residual clamping force because, when the plunger force is removed, the elastic spring-back of the rivet is partially offset by the elastic spring-back of the full-roll.

B. A full-roll can protect the workpieces from high rivet setting forces. If the rivet is designed so that the roll reaches the shank of the rivet, as shown in FIG. 6, before excess force has been transmitted to the workpieces, the inherent strength of the roll is such that the rivet can withstand any excess force without transmitting that force in the axial direction of the rivet to the workpieces. In many cases it has been found the strength of a rivet with a full-roll which reaches the shank is such that any increase in plunger force will cause the rivet shank to swell rather than the roll to deform.

C. A full-roll can provide an anchor on to which other components can be hooked. If, as shown in FIG. 7, there is sufficient protruding tube of the rivet to ensure the leading edge of the roll reaches the shank of the rivet before the roll has reached the workpiece, thereby providing a toroidal roll, the stability of the roll can be used to allow sufficient plunger force to cause the shank to swell thereby securing the shank of the rivet in the workpieces. The difference in the diameters of the toroidal roll and the protruding shank of the rivet can provide a convenient means for hooking other components (not illustrated) onto the fastening and thus the workpieces.

FIG. 8 illustrates an important application of a full-roll rivet 11 according to the present invention in securing a brake lining 21 to a corresponding brake shoe 23. The requirement is that the lining 21 must be clamped sufficiently securely to the shoe 23 that it can withstand the high shear forces generated during the braking operation without moving relative to the shoe. This secure clamping has to be achieved by passing rivets 11 through holes in the lining 21 and the shoe 23 and securing the rivets by roll setting as shown in FIG. 8.

The maximum safe compressive force to which the material of the brake lining 21 can be exposed during the rivet setting operation is strictly limited, and the requirement is to generate sufficient residual clamping force without the peak setting force exceeding this safe limit.

For any given peak setting load it has been found the residual clamping force generated by a full-roll is significantly greater than the corresponding residual clamping force generated by a conventional roll. FIG. 9 is a graph comparing the setting force and residual clamping force for a conventional roll rivet (dashed line) with those for a full-roll rivet (solid line). In many applications the residual clamping force of a full-roll rivet is of the order of 100 percent greater than the corresponding residual clamping force for a conventional roll rivet. Hence full-roll riveting allows the use of lower peak clamping loads whilst still generating significantly increased residual clamping forces.

The benefits of a full-roll are particularly important when fastening assemblies such as vehicle brakes, which need to function effectively at temperatures as high as 800° C. At these temperatures thermal expansion increases the length of a rivet to the point where, if the elastic spring-back of the roll of the rivet is not effective, any clamping force which was present at ambient temperatures will be lost. If, however, the rivet remains a free fit in the brake shoe after application, residual clamping force can be retained at high temperatures due to the elastic spring-back of the roll compensating for the increase in length of the rivet shank due to thermal expansion.

What is claimed is:

1. A fastening incorporating a tubular rivet passing through aligned apertures in a plurality of superposed workpieces the rivet having a tubular shank and an enlarged head, which shank is deformed outwardly to retain the rivet in the apertures, wherein the tubular shank is rolled outwardly forming a toroid in which material which was originally on an inner surface of the tubular shank prior to deformation is on an outer surface of the toroid and able to contact a surface of one of the workpieces, and material which was originally on an outer surface of the tubular shank prior to deformation is on an inner surface of the toroid and is distant from the workpieces, the toroid engaging the surface of said one workpiece and exerting a residual clamping force between the toroid and the enlarged head due to elastic spring-back of the toroid so as to urge the workpieces together.

2. A fastening as claimed in claim 1, wherein the tubular shank of the rivet is rolled through an angle greater than 180°.

3. A fastening as claimed in claim 2, wherein the tubular shank of the rivet is rolled through an angle greater than about 225°.

4. A fastening as claimed in claim 3, wherein the tubular shank of the rivet is rolled through an angle of about 270°.

5. A fastening as claimed in claim 4, wherein a free end of the deformed tubular shank forming the toroid contacts the outer surface of the tubular shank in a substantially undeformed region thereof.

6. A fastening as claimed in claim 1, wherein the tubular shank is a free fit in the apertures.

7. A fastening as claimed in claim 1, wherein the tubular shank is of substantially constant diameter.

8. A fastening as claimed in claim 1 wherein said aligned apertures in said workpieces are substantially coextensive.

9. A brake assembly comprising a first workpiece in the form of a brake shoe and a second workpiece in the form of a brake lining superposed relative to the brake shoe, the brake shoe and the brake lining having aligned apertures, and a tubular rivet passing through the apertures, the rivet having a tubular shank and an enlarged head, which shank is deformed outwardly to retain the rivet in the apertures, wherein the tubular shank is rolled outwardly forming a toroid in which material which was originally on an inner surface of the tubular shank prior to deformation is on an outer surface of the toroid and able to contact a surface of the brake shoe, and material which was originally on an outer surface of the tubular shank prior to deformation is on an inner surface of the toroid and is distant from the brake shoe, the toroid engaging the surface of the brake shoe and exerting a residual clamping force between the toroid and the enlarged head due to elastic spring-back of the toroid so as to urge the brake lining and brake shoe together.

10. A brake assembly as claimed in claim 9, wherein the tubular shank is a free fit in the apertures.

11. A brake assembly as claimed in claim 9, wherein the tubular shank is of substantially constant diameter.

12. A brake assembly as claimed in claim 9, wherein the tubular shank of the rivet is rolled through an angle greater than 180°.

13. A brake assembly as claimed in claim 12, wherein the tubular shank of the rivet is rolled through an angle greater than 225°.

14. A brake assembly as claimed in claim 13, wherein the tubular shank of the rivet is rolled through an angle of about 270°.

15. A brake assembly as claimed in claim 14, wherein a free end of the deformed tubular shank forming the toroid contacts the outer surface of the tubular shank in a substantially undeformed region thereof.

* * * * *